United States Patent
Park

(10) Patent No.: US 10,782,927 B2
(45) Date of Patent: Sep. 22, 2020

(54) APPARATUS AND METHOD FOR OPTIMIZING NAVIGATION PERFORMANCE

(71) Applicants: Hyundai Motor Company, Seoul (KR); Kia Motors Corporation, Seoul (KR)

(72) Inventor: Young Woo Park, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/714,949

(22) Filed: Sep. 25, 2017

(65) Prior Publication Data

US 2018/0267763 A1 Sep. 20, 2018

(30) Foreign Application Priority Data

Mar. 17, 2017 (KR) .................. 10-2017-0033969

(51) Int. Cl.

| | |
|---|---|
| *G06F 3/14* | (2006.01) |
| *B60W 40/02* | (2006.01) |
| *B60W 40/08* | (2012.01) |
| *G01C 21/26* | (2006.01) |
| *G01C 21/34* | (2006.01) |
| *G01C 21/36* | (2006.01) |
| *G06F 3/147* | (2006.01) |
| *G01S 19/13* | (2010.01) |
| *G01S 19/42* | (2010.01) |

(52) U.S. Cl.
CPC .......... *G06F 3/1431* (2013.01); *B60W 40/02* (2013.01); *B60W 40/08* (2013.01); *G01C 21/26* (2013.01); *G01C 21/3484* (2013.01); *G01C 21/3641* (2013.01); *G06F 3/147* (2013.01); *B60W 2040/0881* (2013.01); *B60W 2552/00* (2020.02); *B60W 2554/00* (2020.02); *G01S 19/13* (2013.01); *G01S 19/42* (2013.01); *G09G 2380/10* (2013.01)

(58) Field of Classification Search
None
See application file for complete search history.

(56) References Cited

U.S. PATENT DOCUMENTS

| | | | |
|---|---|---|---|
| 2006/0108932 A1* | 5/2006 | Yamazaki | B60Q 1/143 315/82 |
| 2009/0319107 A1* | 12/2009 | Soma | B60K 6/365 701/22 |
| 2011/0035144 A1* | 2/2011 | Okamoto | G01C 21/3641 701/532 |
| 2015/0158486 A1 | 6/2015 | Healey et al. | |

(Continued)

FOREIGN PATENT DOCUMENTS

| | | |
|---|---|---|
| KR | 10-2008-0056396 A | 6/2008 |
| KR | 10-2012-0062538 A | 6/2012 |

(Continued)

*Primary Examiner* — Kenneth B Lee, Jr.
(74) *Attorney, Agent, or Firm* — Morgan, Lewis & Bockius LLP

(57) ABSTRACT

Provided is a navigation system, which is effectively used depending on driver characteristics and driving conditions, wherein display performance of DUCs including a cluster, front/rear AVNs, and operation systems thereof are controlled through a single controller.

14 Claims, 8 Drawing Sheets

(56) References Cited

U.S. PATENT DOCUMENTS

2016/0214482 A1   7/2016  Kim
2016/0221575 A1*  8/2016  Posch ............... B60W 50/0098

FOREIGN PATENT DOCUMENTS

| KR | 10-2014-0004273 A | 1/2014 |
| KR | 10-2015-0035899 A | 4/2015 |
| KR | 10-1509899 B1 | 4/2015 |
| KR | 10-2016-0027728 A | 3/2016 |
| KR | 10-2016-0092239 A | 8/2016 |
| WO | WO 2015/032508 A1 | 3/2015 |
| WO | WO 2015/088522 A1 | 6/2015 |

* cited by examiner

APPARATUS AND METHOD FOR OPTIMIZING NAVIGATION PERFORMANCE

CROSS-REFERENCE TO RELATED APPLICATION

The present application claims priority to Korean Patent Application No. 10-2017-0033969, filed on Mar. 17, 2017, the entire contents of which is incorporated herein for all purposes by this reference.

BACKGROUND OF THE INVENTION

Field of the Invention

The present invention relates to an apparatus and a method for optimizing navigation performance, and more particularly, to an apparatus for optimizing navigation performance, which provides optimum usability by controlling navigation performance based on driver characteristics and driving conditions and a method of optimizing navigation performance.

Description of Related Art

As performance of an audio video navigation (AVN) controller is improved, a single controller operates a plurality of displays to output information. However, because a vehicle system has a specified performance value, nowadays, performance of the navigation is fixed in all situations. Display performance of navigation is determined by a frame per second (FPS) value, which the controller is capable to output. For example, navigation performance when the controller operates four displays is one-fourth less than navigation performance when the controller operates one display, arithmetically. Meanwhile, a pattern when a driver uses a display may depend on driver characteristics and driving conditions.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing an apparatus for optimizing navigation performance, which makes the use of a navigation system is efficient based on driver characteristics and driving conditions and a method of optimizing navigation performance.

The technical problems to be solved by the present inventive concept are not limited to the aforementioned problems, and any other technical problems not mentioned herein will be clearly understood from the following description by those skilled in the art to which the present invention pertains.

According to various aspects of the present invention, an apparatus for optimizing navigation performance includes a data collection portion configured to collect driver characteristic data and driving condition data, and a controller configured to apply performance priorities to a plurality of devices under control (DUCs) by use of data collected by the data collection portion to change performance.

The controller may include a learning portion configured to apply the performance priorities to repetitively used functions by use of the data collected from the data collection portion and to learn the priorities of the DUCs.

The controller may further include a performance determination portion configured to determine a first optimum performance of a navigation for applying the performance priorities by use of the driver characteristic data and to determine a second optimum performance of the navigation for applying the performance priorities by use of the driving condition data. The driver characteristic data and the driving condition data may be learned from the learning part.

The driver characteristic data may include the number of execution times, a pattern, and use time of an application which is executed based on each function, an output and a switch pattern of a screen, vehicle data including vehicle travel information, and driver sight information.

The driver characteristic data may include data associated with whether another passenger is seated is determined by use of a seating detector at a passenger seat or a rear seat.

The driving condition data may include a vehicle driving mode selected by a driver and data including road information and traffic information, which are received by a global positioning system (GPS).

The DUCs may include a front audio video navigation (AVN), a rear AVN, a cluster, a cluster operation system, a front AVN operation system, and a rear AVN operation system.

According to another aspect of the present invention, a method of optimizing navigation performance including collecting driver characteristics data to learn driver characteristics, and determining a first optimum performance of a navigation for applying performance priorities by use of information learned from the learning of the driver characteristics.

After determining the first optimum performance, the method may further include collecting driving condition data to learn driving conditions, and determining a second optimum performance of a navigation for applying performance priorities by information learned from the learning of the driving conditions.

After determining the second optimum performance, the method may further include controlling a device under control after navigation information is changed into the first optimum performance or the second optimum performance.

The collecting the driver characteristic data may include collecting data including the number of execution times, a pattern, and use time of an application which is executed based on each function, an output and a switch pattern of a screen, vehicle data including vehicle travel information, and driver sight information.

The collecting the driver characteristic data may include collecting data associated with whether another passenger is seated is determined by use of a seating detector at a passenger seat or a rear seat.

The learning the driver characteristics may include applying the performance priorities to repetitively used functions based on the driver characteristic data to learn the performance priorities of devices under control.

The collecting the driving condition data may include collecting data including a vehicle driving mode selected by a driver and data including road information and traffic information, which are received by a global positioning system (GPS).

After collecting the driver characteristic data to learn the driver characteristics, the method may further include determining whether the driver characteristic data is changed.

After collecting the driving condition data to learn the driving conditions, the method may further include determining whether the driving condition data is changed.

According to another aspect of the present invention, a method of optimizing navigation performance including collecting driver characteristic data to learn driver characteristics and collecting driving condition data to learn driving conditions, and determining a first optimum performance of a navigation for prioritizing performance by use of information learned from the learning of the driver characteristics and a second optimum performance of a navigation for prioritizing performance by use of information learned from the learning of the driving conditions.

Before learning the driver characteristics and the driving conditions, the method may further include recognizing a driver After determining the second optimum performance, the method may further include controlling a device under control after navigation information is changed into the first optimum performance or the second optimum performance.

After learning the driver characteristics and the driving conditions, the method may further include determining whether the driver characteristics and the driving conditions are changed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
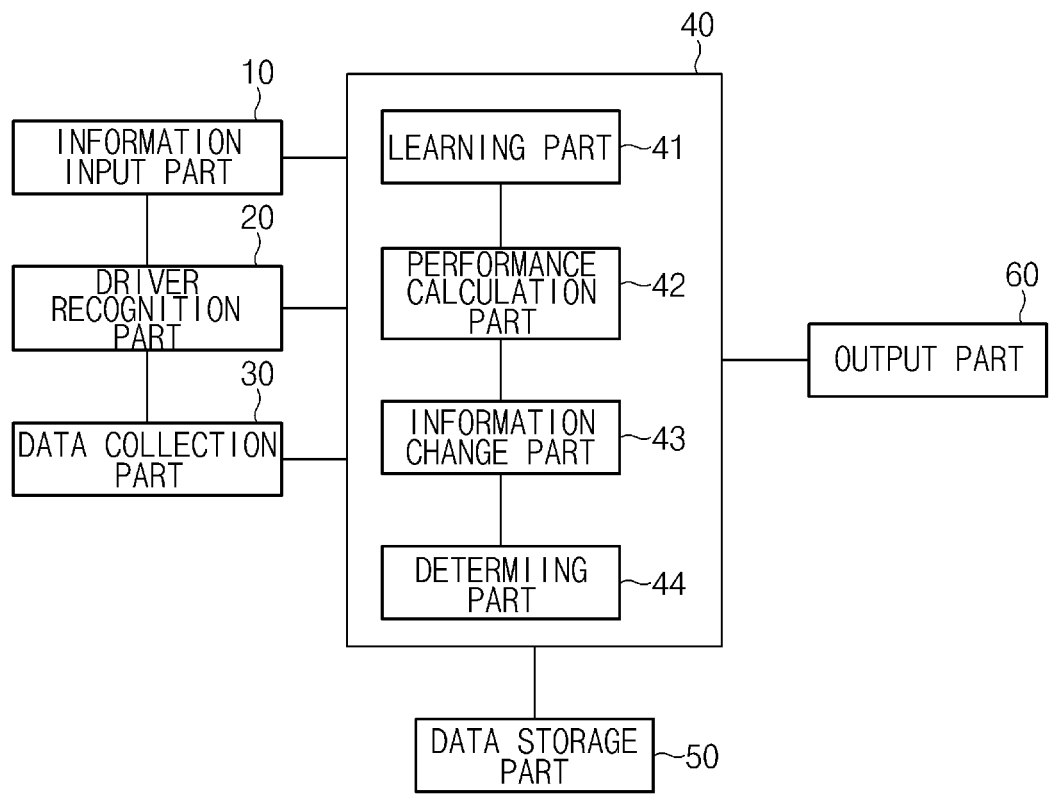
FIG. 1 is a block diagram illustrating an apparatus for optimizing navigation performance, according to an exemplary embodiment of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, exemplary embodiments of the present invention will be described in detail with reference to the accompanying drawings. In the drawings, the same reference numbers will be used throughout to designate the same or equivalent elements. In addition, a detailed description of well-known features or functions will be ruled out in order not to unnecessarily obscure the gist of the present invention.

In describing elements of exemplary embodiments of the present invention, the terms $1^{st}$, $2^{nd}$, first, second, A, B, (a), (b), and the like may be used herein. These terms are only used to distinguish one element from another element, but do not limit the corresponding elements irrespective of the order or priority of the corresponding elements. Unless otherwise defined, all terms used herein, including technical or scientific terms, have the same meanings as those generally understood by those skilled in the art to which the present invention pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 illustrates an apparatus for optimizing navigation performance, according to an exemplary embodiment of the present invention.

As illustrated in FIG. 1, an apparatus for optimizing navigation performance according to an exemplary embodiment of the present invention includes an information input portion 10, a driver recognition portion 20, a data collection portion 30, a controller 40, a data storage portion 50, and an output portion 60.

The information input portion 10 may include a touchscreen which is used when information is input or when an application is executed. The information input portion 10 may include a front audio video navigation (AVN) touchscreen and a rear AVN touchscreen.

The driver recognition portion 20 may include a camera, an iris scanning device, and a fingerprint scanning device in a vehicle. The driver recognition portion 20 may include a device, which allows the driver to input driver information in advance stored in the vehicle.

The data collection portion 30 may collect driver characteristic data and driving condition data. The driver characteristic data includes the number of times of execution and a pattern of an application which is executed depending on each function, use time of the application for each function, an output and a switch pattern of a screen, vehicle data including vehicle travel information, driver sight information, etc., which are provided through the information input portion 10. In addition to the above-described embodiments, a driver behavior pattern provided from the information input portion 10 may be collected through the data collection portion 30. In addition to data associated with the driver, data associated with whether another passenger is seated at a passenger seat or a rear seat may be collected and whether another passenger is seated is determined by use of a seating sensor.

In addition, the driving condition data may be collected through the driver behavior pattern provided from the information input portion 10 in the vehicle. For example, the driving condition data may include a vehicle driving mode (an eco-mode, a sports mode, and/or a normal mode) which is selected by the driver. In addition, road information and traffic information, which are received by a global positioning system (GPS). The driving condition data may be collected at a time interval, periodically, and therefore travel state may be easily checked.

The controller 40 includes a learning portion 41, a performance determination portion 42, an information change portion 43, and a determining portion 44.

The learning portion 41 may learn priority of the output portion 60 (a cluster, a front AVN, and a rear AVN) by use of driver characteristic data and driving condition data, which are collected from the data collection portion 30. For example, the learning portion 41 may learn which application is preferentially booted up based on use order of applications which are used after a passenger rides in a vehicle, and use priority of rear applications may be learned by use of screen output time and an operation pattern. Through combination of vehicle data and driver sight information, which the output portion 60 is preferentially used depending on driving condition may be learned.

In addition, the learning portion 41 may learn priority of the output portion 60 by use of driving condition data collected from the data collection portion 30. In the case that an external driving circumstance is changed, more particularly, in the case that driving condition is changed from city driving to highway driving, the learning portion 41 may learn to reduce performance of a front AVN because the driver does not need to watch a navigation compared with city driving, and may learn that the rest performance is assigned to an operation in which collected data is stored in the data storage portion 50.

The determining portion 44 compares driver characteristic data with initial values set for each are configured to determine whether driver characteristic data is changed. In the instant case, the initial values include factory initial settings of the navigation. The navigation default settings include display information, which is in advance set to a specific value and initialized application data. In addition, the determining portion 44 determines whether road travel state is changed by use of driving condition data, which is periodically collected at a time interval.

The performance determination portion 42 may determine a first optimum performance of the navigation by use of learned driver characteristic data from learning portion and a second optimum performance of a navigation by use of driving condition data. The first optimum performance may be determined by being preferentially assigned to a function, which is frequently used based on learned driver characteristic data from learning part. The second optimum performance may be determined by being preferentially assigned to a function which is frequently used based on driving condition data. According to an embodiment, in the case that driving condition is changed from city driving to highway driving, the performance determination portion 42 may learn to reduce performance of a front AVN because the driver does not need to watch a navigation compared with city driving, and may determine performance priority in which collected data is stored in the data storage portion 50.

The information change portion 43 may change navigation information to the optimum performance determined by the performance determination portion 42. The optimum performance may be applied to the output portion 60 which the driver determines to be important such that the optimum performance is assigned to system sources (central processing unit (CPU), graphics processing unit (GPU), memory, network, bandwidth, etc.).

The output portion 60 is a display, which displays information input by a driver or a passenger. The output portion 60 may include a touchscreen. The output parts 60 may include a plurality of output parts in a vehicle and, for example, may include a front AVN, a rear AVN, a cluster, etc. The output portion 60 may include a display device which is capable to display information including vehicle information, a destination, a map including road condition, a travel route, etc.

Figure 2:
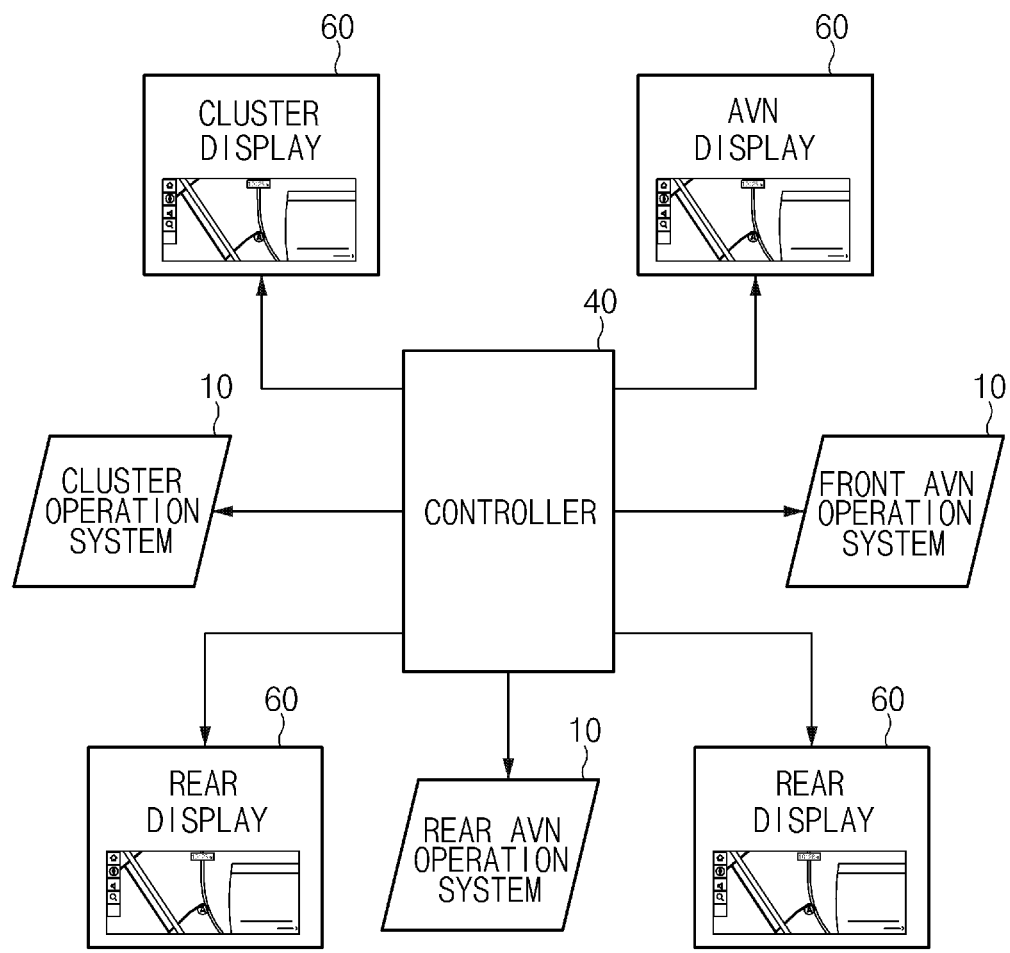
FIG. 2 is a block diagram illustrating an operation of an apparatus for optimizing navigation performance, according to an exemplary embodiment of the present invention.

FIG. 2 is a block diagram illustrating an operation of an apparatus for optimizing navigation performance, according to an exemplary embodiment of the present invention.

As illustrated in FIG. 2, the controller 40 according to an exemplary embodiment of the present invention simultaneously controls a plurality of devices under control (DUCs). In the instant case, the plurality of DUCs may include the plurality of input parts 10 and the plurality of output parts 60, and, for example, may include a cluster display, a front AVN, a rear AVN, a cluster operation system, a front ANV operation system, and a rear AVN operation system.

After the single controller 40 applies and learns driver characteristics and driving conditions, the plurality of DUCs may operate at optimum values, and therefore the present invention may improve display performance. Namely, the single controller 40 may not steadily operate the plurality of DUCs at a specific value, but they may operate the plurality of DUCs at the optimum values to which driver characteristics and driving conditions are applied. Therefore, the DUCs may be prevented from being driven at the specific value. the present may mean that the controller 40 efficiently controls the DUCs.

Figure 3:
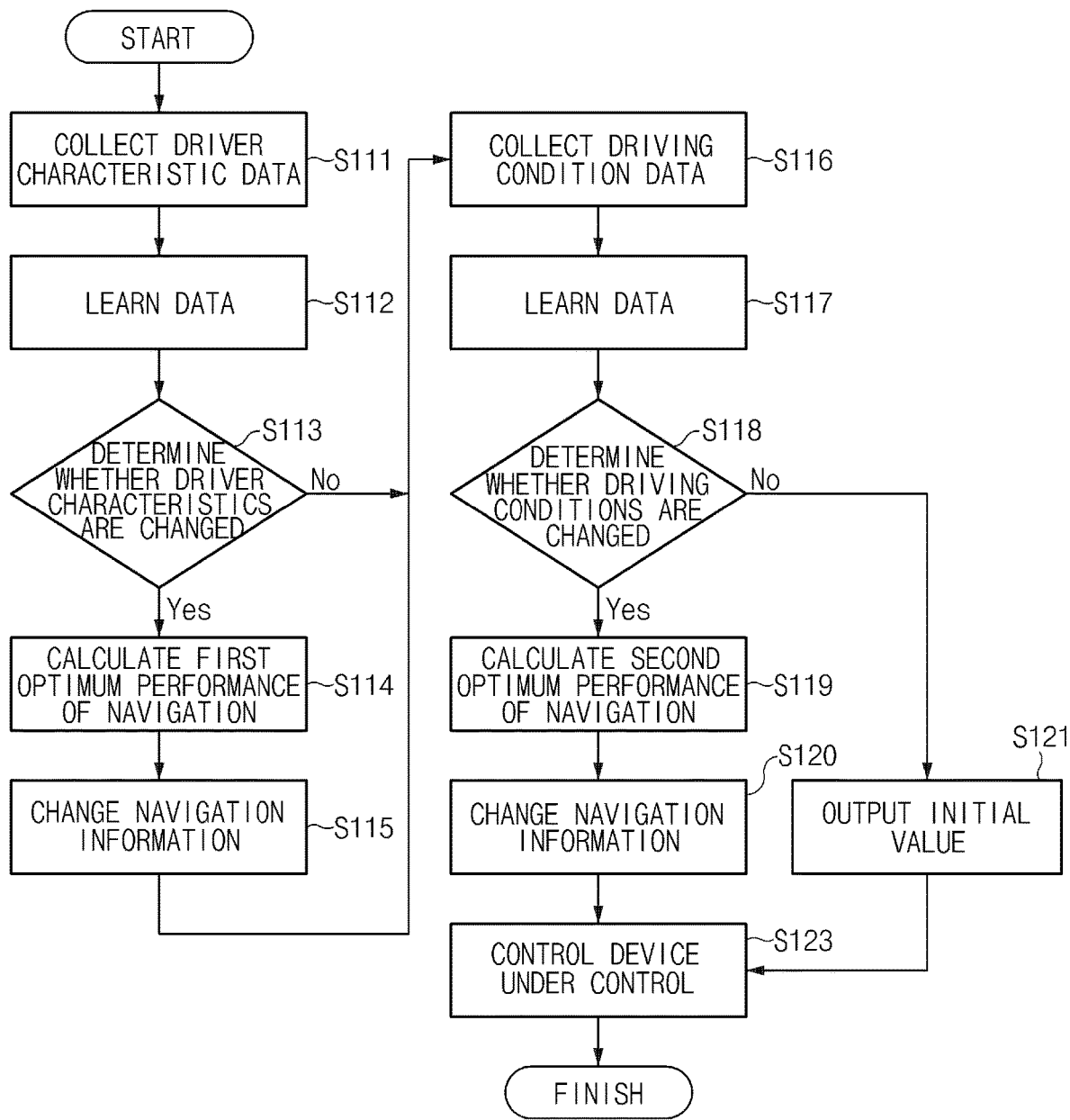
FIG. 3 is a flowchart illustrating a method of optimizing navigation performance, according to various exemplary embodiments of the present invention.

FIG. 3 is a flowchart illustrating a method of optimizing navigation performance, according to various exemplary embodiments of the present invention.

As illustrated in FIGS. 1 and 3, the data collection portion 30 collects driver characteristic data, which is received through the information input portion 10 (S111). The learning portion 41 learns driver characteristics by use of driver characteristic data, which is collected in operation S111 (S112). The determining portion 44 determines whether the driver characteristics are changed based on the driver characteristics learned in operation S112 (S113). When the determining portion 44 determines that the driver characteristics are changed (YES), the performance determination portion 42 determines the first optimum performance (S114). When the driver characteristics are not changed (NO), the data collection portion 30 performs operation S116. The information change portion 43 changes navigation information to the first optimum performance, which is determined in operation S114 (S115).

In sequence, the data collection portion 30 collects driving condition data (S116). The learning portion 41 learns driving conditions by use of driving condition data collected in operation S116 (S117). The determining portion 44 determines whether the driving conditions are changed based on the driving conditions learned in operation S117 (S118). When the driving conditions are changed (YES), the performance determination portion 42 determines a second optimum performance of a navigation (S119). When the driving conditions are not changed (NO), an initial value is output (S121). In the instant case, the initial value may be factory default settings of devices under control (DUCs), which are controlled by the controller 40. The information change portion 43 changes the navigation information to the second optimum performance, which is determined in operation S119 (S120). In succession, the DUCs are controlled based on the initial value or the changed value, to which the first optimum performance and the second optimum performance (S123) is applied.

Figure 4:
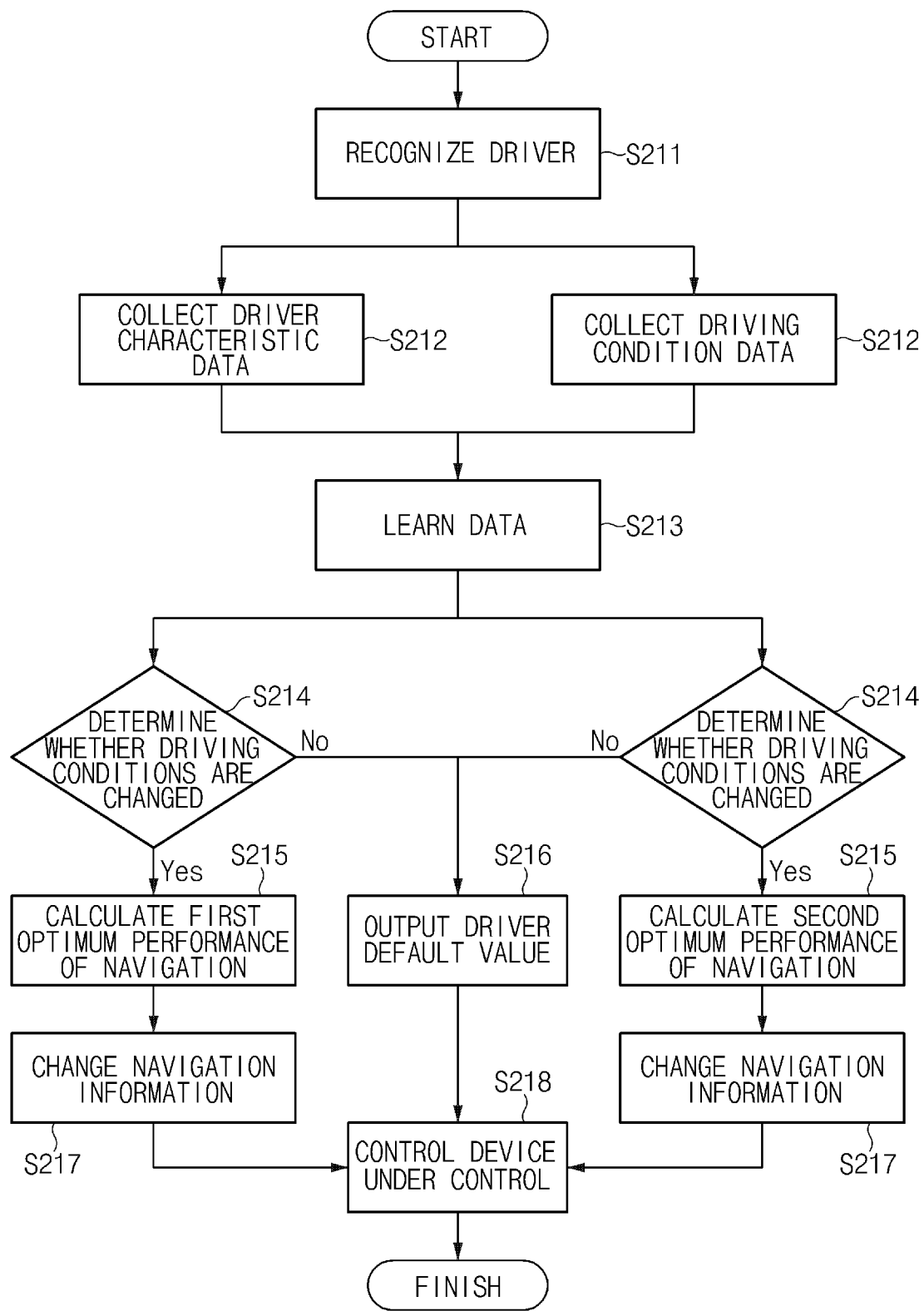
FIG. 4 is a flowchart illustrating a method of optimizing navigation performance, according to various exemplary embodiments of the present invention.

FIG. 4 is a flowchart illustrating a method of optimizing navigation performance, according to various exemplary embodiments of the present invention.

As illustrated in FIGS. 1 and 4, a driver is recognized by the driver recognition portion 20 (S211). When the driver is recognized, the data collection portion 30 collects driving characteristic data and driving condition data, which are received through an information input portion 10 (S212). The learning portion 41 learns driver characteristics and driving conditions by use of driving characteristic data and driving condition data, which are collected in operation S212 (S213).

The determining portion 44 determines whether driver characteristics and driving conditions are changed based on the driver characteristics and the driving conditions, which are learned in operation S213 (S214). When the determining portion 44 determines that there is a change (YES), when the change is disposed in the driver characteristics, the performance determination portion 42 determines a first optimum performance of a navigation, and when the change is disposed in the driving conditions, the performance determination portion 42 determines a second optimum performance of a navigation (S215). When the determining portion 44 determines there is no change (NO), driver default values, to which a specific driver characteristic value or driving condition value is applied, are output (S216).

The information change portion 43 changes navigation information to the first optimum performance and the second optimum performance, which are determined in operation S216 (S217). In sequence, devices under control (DUCs) are controlled at the driver initial values or changed values, to which the first optimum performance and the second optimum performance are applied (S218).

Figure 5:
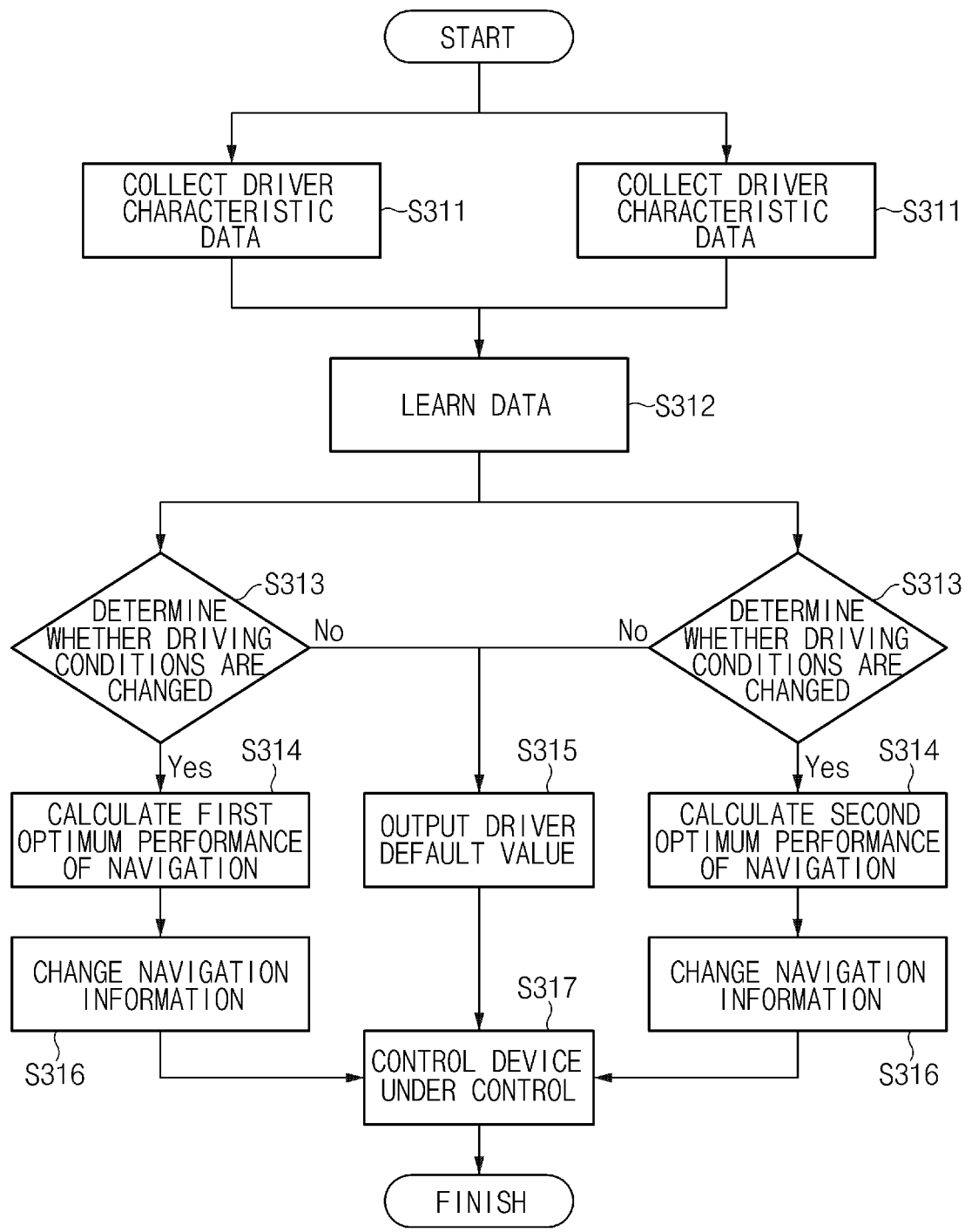
FIG. 5 is a flowchart illustrating a method of optimizing navigation performance, according to various exemplary embodiments of the present invention.

FIG. 5 is a flowchart illustrating a method of optimizing navigation performance, according to various exemplary embodiments of the present invention.

As illustrated in FIGS. 1 and 5, the data collection portion 30 collects driver characteristic data and driving condition data, which are received from the information input portion 10 (S311). The learning portion 41 learns driver characteristics and driving conditions by use of the driver characteristic data and the driving condition data, which are collected in operation S311 (S312).

The determining portion 44 determines whether driver characteristics and driving conditions are changed based on the driver characteristics and the driving conditions, which are learned in operation S312 (S313). When the determining portion 44 determines that there is a change (YES), when the change is disposed in the driver characteristics, the performance determination portion 42 determines a first optimum performance of a navigation, and when the change is disposed in the driving conditions, the performance determination portion 42 determines a second optimum performance of the navigation (S314). When the determining portion 44 determines there is no change (NO), an initial value is output (S315). In the instant case, the initial value may be factory default settings of devices under control (DUCs), which are controlled by the controller 40. The information change portion 43 changes navigation information to the first optimum performance and the second optimum performance (S316). In sequence, the DUCs are controlled at the initial value or the changed value to which the first optimum performance and the second optimum performance are applied (S317).

Figure 6:
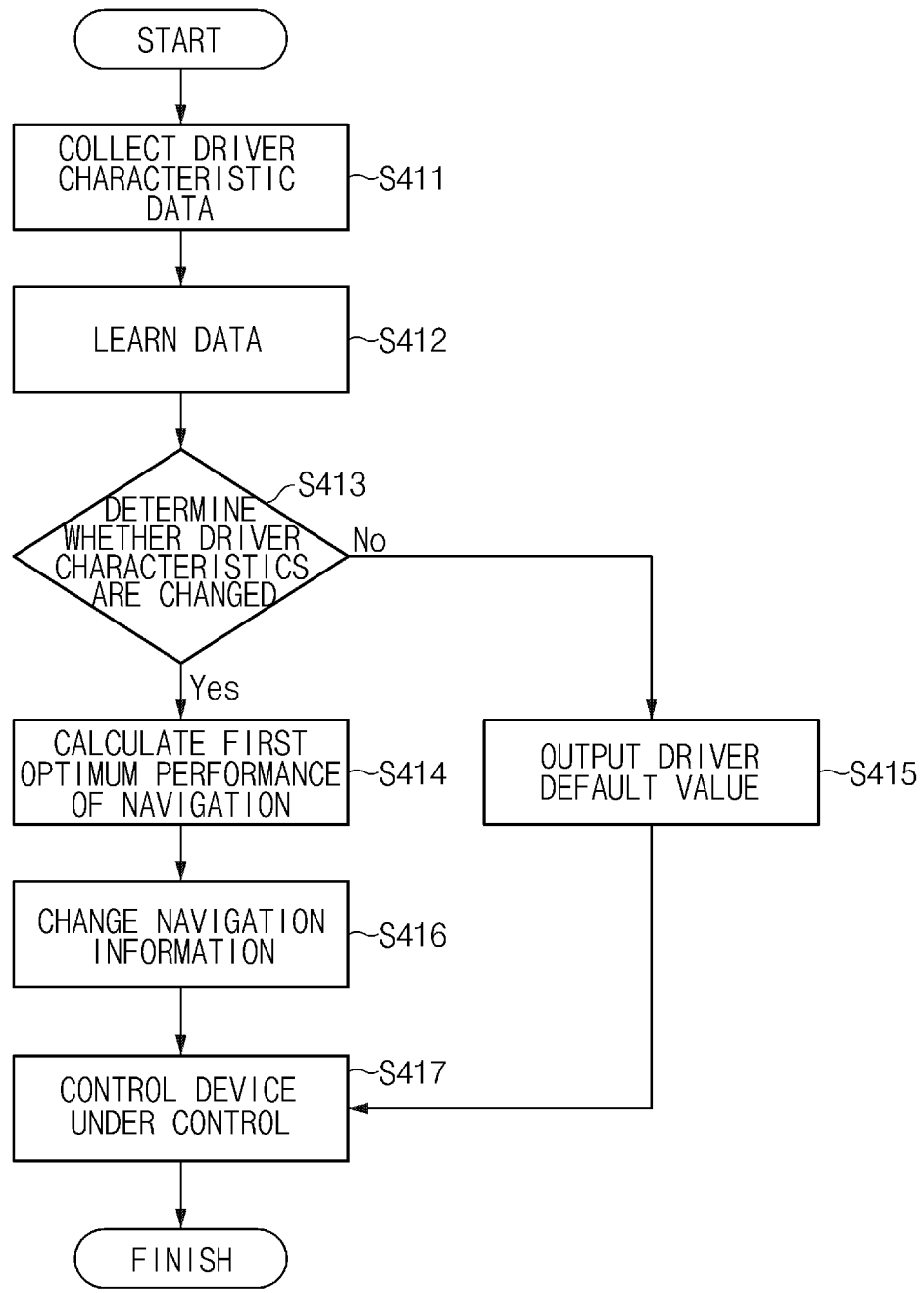
FIG. 6 is a flowchart illustrating a method of optimizing navigation performance, according to various exemplary embodiments of the present invention.

FIG. 6 is a flowchart illustrating a method of optimizing navigation performance, according to various exemplary embodiments of the present invention.

As illustrated in FIGS. 1 and 6, the data collection portion 30 collects driver characteristic data, which is received through the information input portion 10 (S411). The learning portion 41 learns driver characteristics by use of driver characteristic data, which is collected in operation S1411 (S142). The determining portion 44 determines whether driver characteristics are changed based on the driver characteristics learned in operation S412 (S413). When the determining portion 44 determines that the driver characteristics are changed (YES), the performance determination portion 42 determines a first optimum performance of a navigation (S414). When the determining portion 44 determines that there is no change (NO), an initial value is output (S415). After navigation information is changed into the first optimum performance (S416), a device under control (DUC) is controlled at a changed value to which the first optimum performance is applied (S417).

Figure 7:
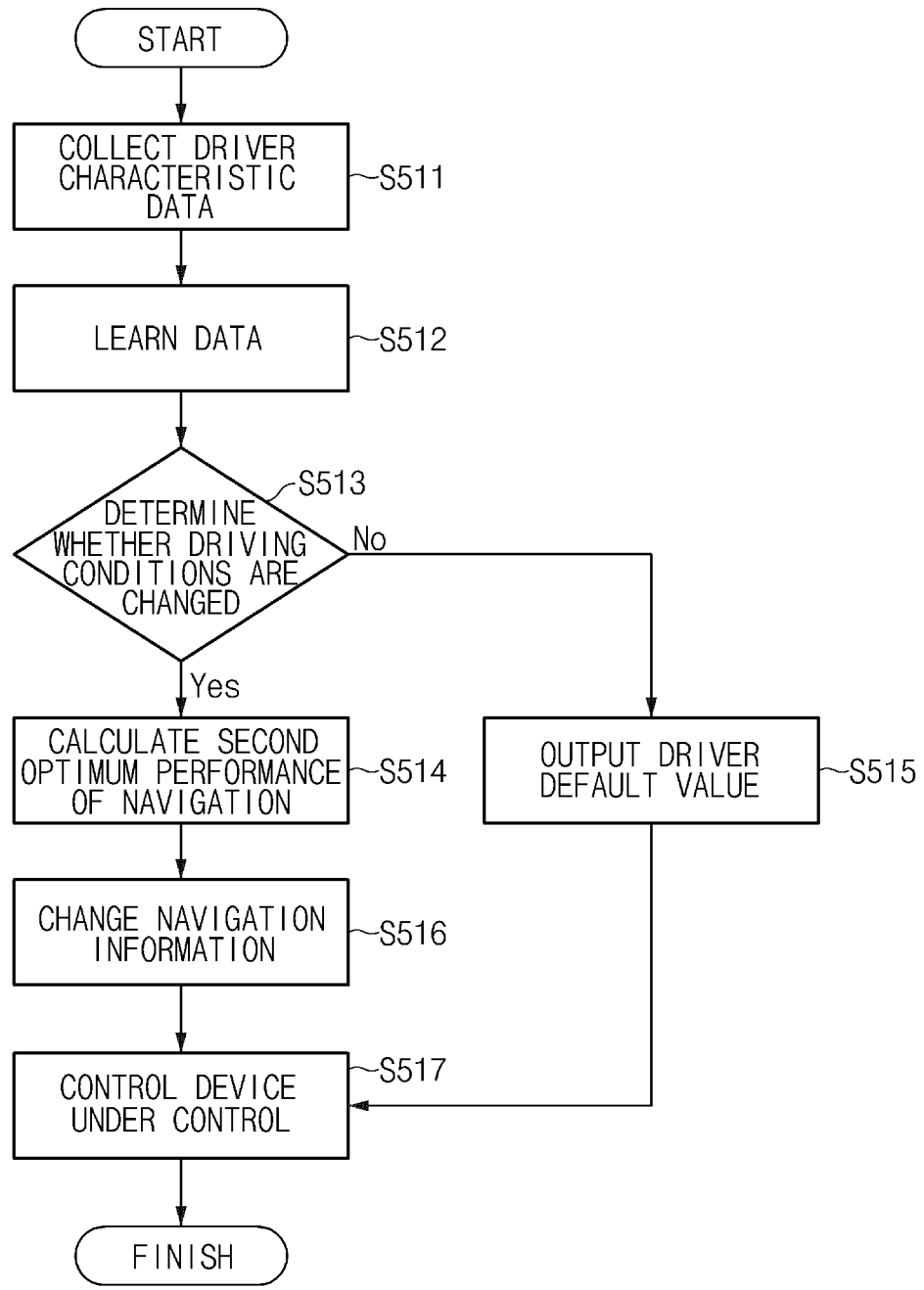
FIG. 7 is a flowchart illustrating a method of optimizing navigation performance, according to various exemplary embodiments of the present invention.

As illustrated in FIGS. 1 and 7, the data collection portion 30 collects driving condition data, which is received through the information input portion 10 (S511). The learning portion 41 learns driving conditions by use of driving condition data, which is collected in operation S511 (S512). The determining portion 44 determines whether driving conditions are changed based on the driving conditions learned in operation S512 (S513). When the determining portion 44 determines that the driving conditions are changed (YES), the performance determination portion 42 determines a second optimum performance of a navigation (S514). When the determining portion 44 determines that the driving conditions are not changed (NO), an initial value is output (S515). After navigation information is changed into the second optimum performance (S516), a device under control is controlled at a changed value to which the second optimum performance is applied (S517).

As described above, according to an exemplary embodiment of the present invention, a single control may easily control a plurality of devices under control (DUCs) based on driver characteristics and driving conditions. Namely, front/rear AVN ON/OFF, brightness control of a display, types of images which are output through the front/rear AVN or a cluster, and so on are changed depending on the driver characteristics and the driving conditions. Therefore, the single controller may easily operate the plurality of DUCs since the plurality of DUCs are not constantly operated at specific values.

Figure 8:
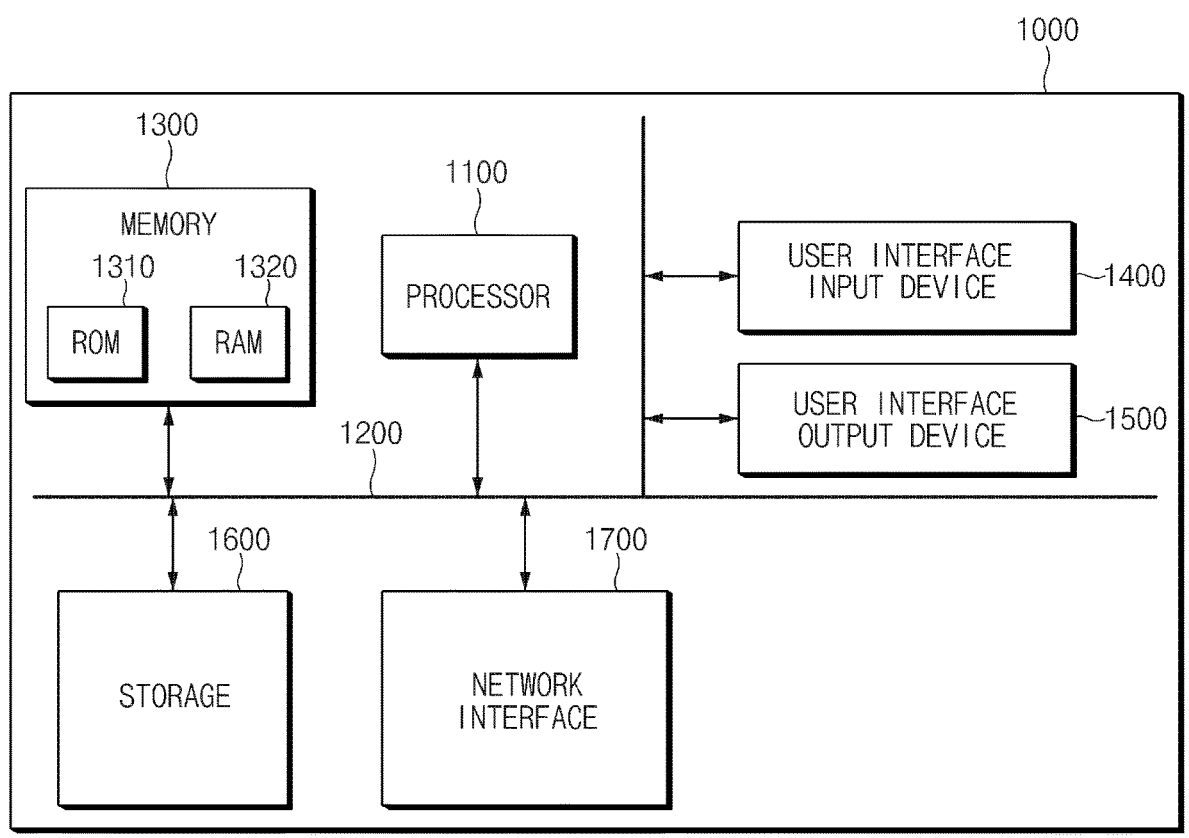
FIG. 8 is a block diagram illustrating elements of a computer system which operates a method according to an exemplary embodiment of the present invention.

FIG. 8 is a view illustrating a configuration of a computing system executing a method according to an exemplary embodiment of the present invention.

Referring to FIG. 8, a computing system 1000 may include a processor 1100, a memory 1300, a user interface input device 1400, a user interface output device 1500, a storage 1600, and a network interface 1700, at least one which is connected by a bus 1200 each other.

The processor 1100 may be a semiconductor device, which executes process of commands stored in a central processing unit (CPU) or the memory 1300 and/or the storage 1600. The memory 1300 and the storage 1600 may include a variety of volatile storage mediums or non-volatile storage mediums. For example, the memory 1300 may include a read only memory (ROM) and a random access memory (RAM).

Accordingly, a method or algorithm described with respect to the embodiments disclosed herein may be implemented directly with hardware, a software module executed by a processor 1100, or a combination thereof. The software module may reside in a storage medium (namely, the memory 1300 and/or the storage 1600), such as a RAM memory, a flash memory, a ROM memory, an EPROM memory, an EEPROM memory, a register, a hard disk, a removable disk, a compact disc read-only memory (CD-ROM). An exemplary storage medium is coupled to the processor 1100, the processor 110 may read information from the storage medium and write information in the storage medium. Alternatively, the storage medium may be integrated into the processor 1100. The processor 1100 and the storage medium may be implemented in an application specific integrated circuit (ASIC). The ASIC may be implemented in a user terminal. Alternatively, the processor 1100 and the storage medium may be implemented as discrete components in a user terminal.

According to the above, various aspects of the present invention provide navigation performance which is effectively optimized, in which one controller controls display performance of a cluster and front and rear displays based on driver characteristics and driving conditions.

While the present invention has been described with reference to exemplary embodiments, it will be apparent to those skilled in the art that various changes and modifications may be made without departing from the spirit and scope of the present invention.

For convenience in explanation and accurate definition in the appended claims, the terms "upper", "lower", "internal", "outer", "up", "down", "upper", "lower", "upwards", "downwards", "front", "rear", "back", "inside", "outside", "inwardly", "outwardly", "internal", "external", "internal", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An apparatus for optimizing navigation performance, the apparatus comprising:
    a data collection portion configured to collect driver characteristic data and driving condition data; and
    a controller configured to control a plurality of devices under control (DUCs) to change performances thereof, according to optimum performance calculated on a basis of the collected driver characteristic data and the driving condition data,
    wherein the controller is assigned to a system source of the controller in order to apply the optimum performance to the plurality of devices under control (DUCs),
    wherein the controller includes:
        a learning portion configured to apply performance priorities to repetitively used functions by use of at least one of the driver characteristic data and the driving condition data collected from the data collection portion and to learn the performance priorities of the DUCs,
    wherein the optimum performance includes a first optimum performance and a second optimum performance,
    wherein the controller further includes:
        a performance determination portion configured to determine the first optimum performance of a navigation for applying the performance priorities by use of the driver characteristic data and to determine the second optimum performance of the navigation for applying the performance priorities by use of the driving condition data, and
    wherein the driver characteristic data and the driving condition data are learned from a learning part.

2. The apparatus of claim 1, wherein the driver characteristic data includes a number of execution times, a pattern, and use time of an application which is executed based on each function, an output and a switch pattern of a screen, vehicle data including vehicle travel information, and driver sight information.

3. The apparatus of claim 1, wherein the driver characteristic data includes data associated with whether other passenger is seated and is determined by use of a seating detector at a passenger seat or a rear seat.

4. The apparatus of claim 1, wherein the driving condition data includes a vehicle driving mode selected by a driver and data including road information and traffic information, which are received by a global positioning system (GPS).

5. The apparatus of claim 1, wherein the DUCs include a front audio video navigation (AVN), a rear AVN, a cluster, a cluster operation system, a front AVN operation system, and a rear AVN operation system.

6. A method of optimizing navigation performance, the method comprising:
    collecting driver characteristics data to learn driver characteristics;
    collecting driving condition data to learn driving conditions;
    calculating optimum performance on a basis of the collected driver characteristic data and the driving condition data;
    assigning a system source of a controller, to the controller in order to apply the optimum performance to a plurality of device under control (DUCs); and
    controlling the plurality of devices under control (DUCs) to change performances thereof, according to the optimum performance,
    wherein calculating optimum performance includes:
    calculating a first optimum performance on a basis of information learned from the learning of the driving characteristics; and
    calculating a second optimum performance on a basis of information learned from the learning of the driving conditions.

7. The method of claim 6, wherein the controlling the plurality of devices under control (DUCs) includes:
   after calculating of the second optimum performance,
   controlling the plurality of devices under control (DUCs) at the first optimum performance or the second optimum performance.

8. The method of claim 6, wherein the collecting of the driver characteristic data includes:
   collecting data including a number of execution times, a pattern, and use time of an application which is executed based on each function, an output and a switch pattern of a screen, vehicle data including vehicle travel information, and driver sight information.

9. The method of claim 6, wherein the collecting of the driver characteristic data includes:
   collecting data associated with whether other passenger is seated, the data being determined by use of a seating detector at a passenger seat or a rear seat.

10. The method of claim 6, wherein the learning of the driver characteristics includes:
    applying performance priorities to repetitively used functions based on the driver characteristic data to learn the performance priorities of the plurality of devices under control.

11. The method of claim 6, wherein the collecting of the driving condition data includes:
    collecting data including a vehicle driving mode selected by a driver and data including road information and traffic information, which are received by a global positioning system (GPS).

12. The method of claim 6, further including:
    after collecting the driver characteristic data to learn the driver characteristics,
    determining whether the driver characteristic data is changed.

13. The method of claim 6, further including:
    after collecting the driving condition data to learn the driving conditions,
    determining whether the driving condition data is changed.

14. A method of optimizing navigation performance, the method comprising:
    recognizing a driver;
    collecting driver characteristic data to learn driver characteristics and collecting driving condition data to learn driving conditions;
    calculating optimum performance on a basis of the collected driver characteristic data and the collected driving condition data;
    assigning system source of controller in order to apply optimum performance to a plurality of devices under control (DUCs); and
    controlling the plurality of devices under control (DUCs) to change performances thereof, according to the optimum performance,
    wherein the calculating optimum performance including:
       calculating a first optimum performance on a basis of information learned from the learning of the driving characteristics; and
       calculating a second optimum performance on a basis of information learned from the learning of the driving conditions.

* * * * *